United States Patent
Niiyama (10) Patent No.: US 7,782,314 B2
(45) Date of Patent: Aug. 24, 2010

(54) DEVICE AND SYSTEM FOR SYNCHRONIZING IMAGE SIGNALS TRANSMITTED WITH SUPERIMPOSED SIGNALS

(75) Inventor: Tetsuya Niiyama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1133 days.

(21) Appl. No.: 10/851,228

(22) Filed: May 24, 2004

(65) Prior Publication Data

US 2004/0252239 A1 Dec. 16, 2004

(30) Foreign Application Priority Data

May 29, 2003 (JP) .............................. 2003-151996

(51) Int. Cl.
*G06F 3/038* (2006.01)
*G06F 13/14* (2006.01)
*H04N 5/14* (2006.01)

(52) U.S. Cl. .................... 345/213; 345/520; 348/571

(58) Field of Classification Search ................. 345/213, 345/520; 348/571
See application file for complete search history.

(56) References Cited

U.S. PATENT DOCUMENTS

| | | | | | |
|---|---|---|---|---|---|
| 4,454,530 | A | * | 6/1984 | Yoshinaka et al. | 348/527 |
| 4,549,216 | A | * | 10/1985 | Yuki | 348/806 |
| 5,227,882 | A | * | 7/1993 | Kato | 348/571 |
| 5,294,987 | A | * | 3/1994 | Saeger et al. | 348/536 |
| 5,327,240 | A | * | 7/1994 | Golston et al. | 348/607 |
| 5,442,371 | A | * | 8/1995 | Miller et al. | 345/98 |
| 5,673,087 | A | * | 9/1997 | Choi et al. | 348/511 |
| 5,721,842 | A | * | 2/1998 | Beasley et al. | 709/204 |
| 5,739,868 | A | * | 4/1998 | Butler et al. | 348/584 |
| 5,790,096 | A | * | 8/1998 | Hill, Jr. | 345/600 |
| 5,937,176 | A | * | 8/1999 | Beasley et al. | 710/317 |
| 6,268,889 | B1 | * | 7/2001 | Koori | 348/642 |
| 6,735,658 | B1 | * | 5/2004 | Thornton | 710/305 |
| 6,982,765 | B2 | * | 1/2006 | Testin et al. | 348/634 |

FOREIGN PATENT DOCUMENTS

| | | | |
|---|---|---|---|
| EP | 1274229 A1 | * | 1/2003 |
| JP | 63-133777 | | 9/1988 |
| JP | 2-13087 | | 1/1991 |
| JP | 3-73089 | | 7/1991 |
| JP | 4-119093 | | 4/1992 |
| JP | 10-509545 | | 9/1998 |
| JP | 11-103440 | * | 4/1999 |
| JP | 2915431 | | 4/1999 |
| JP | 2000-175203 | | 6/2000 |
| WO | 97/08625 | | 3/1997 |

OTHER PUBLICATIONS

Japanese Office Action issued on Mar. 31, 2009 in corresponding Japanese Patent Application 2003-151996.
Japanese Patent Office Notice of Reasons for Rejection, mailed Sep. 15, 2007 and issued in corresponding Japanese Patent Application No. 2003-151996.

* cited by examiner

*Primary Examiner*—Hoang-Vu A Nguyen-Ba
(74) *Attorney, Agent, or Firm*—Staas & Halsey LLP (57) ABSTRACT

A remote unit includes: a receiving part that receives image signals superimposed on other signals via a first network; an outputting part that outputs the image signals to a second network; a separating part that separates the image signals from the other signals; and an adjusting part that adjusts delays of the image signals.

10 Claims, 10 Drawing Sheets

HSYNC & G
SUPERIMPOSED SIGNAL

Fig. 5B

HSYNC

DEVICE AND SYSTEM FOR SYNCHRONIZING IMAGE SIGNALS TRANSMITTED WITH SUPERIMPOSED SIGNALS

BACKGROUND OF THE INVENTION

1. Field of the Invention

The present invention generally relates to remote units and remote systems, and more particularly, to a remote unit that can display the operation screen of a server located at a distance and a remote system that includes the remote unit.

2. Description of the Related Art

A display device is normally designed to display an input image by scanning an image with three types of image signals R (Red), G (Green), and B (Blue). Along with the image signals, a horizontal synchronization signal (HSYNC) and a vertical synchronization signal (VSYNC) are also inputted. Based on the horizontal synchronization signal (HSYNC) and the vertical synchronization signal (VSYNC), horizontal synchronization and vertical synchronization are established among the image signals.

A display cable, such as an industry standard BNC cable or a D-sub 15-pin cable, therefore includes five signal lines: three signal lines for the three types of image signals, and two signal lines for the two types of synchronization signals.

In a case where synchronization cannot be established among the RGB image signals, however, a color shift or a blur may be caused on the screen of the display device. It is therefore necessary to establish accurate synchronization among the cables for transmitting the image signals.

Japanese Unexamined Utility Model Publication No. 63-133777 (hereinafter referred to as Patent Document 1), for example, discloses a technique of solving shifts of synchronization that are caused by differences in the delay amount among the cables. In accordance with Patent Document 1, digital video signals, a horizontal synchronization digital signal, and a vertical synchronization digital signal, are transmitted through different cables in a digital address display device, and the differences in the delay amount among the cables are corrected.

In recent years, public attention has been drawn to a technique of controlling a server or the like located at a distance of 100 meters or longer from a user. In such a technique, the server located at a distance needs to be somehow connected to the display device, the keyboard, and other devices located near the user. Therefore, a remote unit for transmission and a remote unit for reception are conventionally provided as intermediate nodes between a server and a display device, and a LAN (Local Area Network) cable connects the transmission remote unit and the reception remote unit.

In a system having remote units between a server and a user, data signals to be transmitted and received include the three image signals (RGB), the horizontal synchronization signal, the vertical synchronization signal, and operation data signals inputted through a keyboard and a mouse. However, a standard LAN cable such as a Cat5E cable includes only four signal lines, and cannot transmit all the data signals through the signal lines.

As a method for solving this problem, Japanese Unexamined Patent Publication No. 10-509545 (hereinafter referred to as Patent Document 2) discloses a technique of superimposing an image signal with either one of the synchronization signals prior to transmission.

In a case where an image signal is superimposed on a synchronization signal, however, it is difficult to maintain synchronization among the image signals by the technique disclosed in Patent Document 1. This is because Patent Document 1 concerns a structure for maintaining phase synchronization among signals, but does not concern a structure for establishing phase synchronization among signals contained in superimposed signals.

Also, the technique disclosed in Patent Document 1 is a digital video technique that does not concern a structure such as an analog display device in which the RGB image signals are independent of one another.

SUMMARY OF THE INVENTION

It is therefore an object of the present invention to provide a remote unit and a remote system in which the above disadvantage is eliminated.

A more specific object of the present invention is to provide a remote unit that can correct a phase shift of each image signal caused by a difference in cable length or a difference in transmission characteristics, even when each image signal is superimposed on another signal. The present invention also provides a remote system that includes the above remote unit.

According to an aspect of the present invention, there is provided a remote unit comprising: a receiving part that receives image signals superimposed on other signals via a first network; an outputting part that outputs the image signals to a second network; a separating part that separates the image signals from the other signals; and an adjusting part that adjusts delays of the image signals.

According to another aspect of the present invention, there is provided a remote unit comprising: a receiving part that receives image signals superimposed on other signals via a first network; an outputting part that outputs the image signals to the second network; a separating part that separates the image signals from the other signals; a detecting part that uses one of the image signals as a reference signal to detect delays of the other image signals; and an adjusting part that adjust delays of the other image signals based on the delays detected by the detecting part.

According to yet another aspect of the present invention, there is provided a remote system comprising: a transmission device that transmits image signals via a first network; and a reception device that receives the image signals via the first network, the transmission device including a superimposing part that convolutes the image signals with other signals, and a transmitting part that transmits the image signals superimposed on the other signals to the first network, and the reception device including a receiving part that receives the image signals via the first network, a separating part that separates the image signals from the other signals, and an adjusting part that adjusts delays of the image signals.

According to a further object of the present invention, there is provided a remote system comprising: a transmission device that transmits image signals via a first network; and a reception device that receives the image signals via the first network, the transmission device including a superimposing part that convolutes-the image signals with other signals, and a transmitting part that transmits the image signals superimposed on the other signals to the first network, and the reception device including a receiving part that receives the image signals via the first network, a separating part that separates the image signals from the other signals, a detecting part that uses one of the image signals as a reference signal to detect delays of the other image signals, and an adjusting part that adjusts delays of the other image signals based on the delays detected by the detecting part.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of embodiments of the present invention, with reference to the accompanying drawings.

First Embodiment

Figure 1:
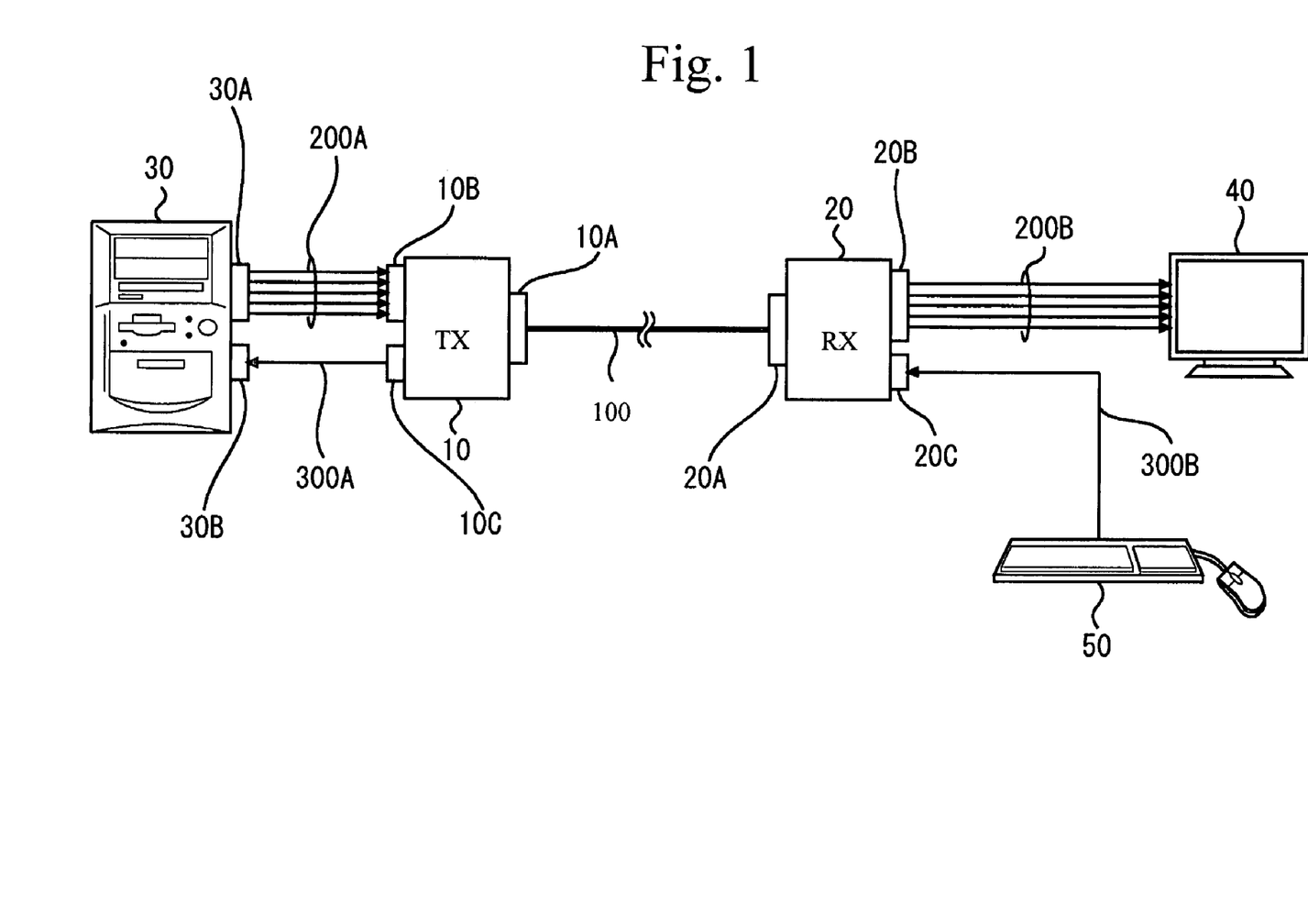
FIG. 1 is a block diagram illustrating the structure of a remote system in accordance with a first embodiment of the present invention.

A first embodiment of the present invention will be first described in detail, with reference to the accompanying drawings. FIG. 1 is a block diagram illustrating the structure of a remote system that employs a remote unit in accordance with this embodiment.

As shown in FIG. 1, the remote system in accordance with this embodiment includes a transmission device 10 and a reception device 20 as a remote unit accompanied by a server 30, a display 40, and a keyboard/mouse 50.

The transmission device 10 and the reception device 20 are connected to each other with a LAN cable 100, so that transmission and reception can be performed between the transmission device 10 and the reception device 20. So as to perform transmission and reception between the transmission device 10 and the reception device 20, the transmission 10 and the reception 20 include network interfaces 10A and 20A, respectively. The LAN cable 100 may be a Cat5E straight cable, for example, and more preferably, a cable having a connector formed with a RJ-45 jack. Such a connector is generally used in a LAN and is easy for a user to come by. These network interfaces 10A and 20A do not serve as network interface layers in an OSI reference model, but may be any types of interfaces as long as they can transmit or receive three types of image signals (RGB: hereinafter referred to simply as image signals where the type of image signal is not limited to one), horizontal synchronization signals HSYNC and vertical synchronization signals VSYNC (hereinafter referred to simply as synchronization signals where the type of synchronization signal is not limited to one), and signals inputted through the keyboard/mouse 50 (hereinafter referred to as operation signals).

The transmission device 10 includes a VGA (Video Graphics Array) connector 10B as a display connector for receiving image signals (RGB), horizontal synchronization signals, and vertical synchronization signals from the server 30 that is a personal computer, a work station, or an information processing apparatus of some other kind. This VGA connector 10B may be an industry standard connector such as a BNC connector or a D-sub 15-pin connector.

The transmission device 10 further includes a keyboard/mouse connector 10C for inputting operation signals of the keyboard/mouse 50, received through the reception device 20, to the server 30. The keyboard/mouse connector 10C may be an industry standard connector used for connection to a keyboard and a mouse, such as a PS/2 connector, a USB (Universal Serial Bus) connector, or a serial connector or some other type.

Like a standard information processing apparatus, the server 30 includes a VGA connector 30A for outputting image signals (RGB), and a keyboard/mouse connector 30B for receiving operation signals from the keyboard or the mouse. Accordingly, the VGA connector 10B provided on the surface of the housing of the transmission device 10 is connected to the VGA connector 30A provided on the surface of the housing of the server 30, with a RGB cable 200A that is a BNC cable or a D-sub 15-pin cable, for example. Likewise, the keyboard/mouse connector 10C provided on the surface of the housing of the transmission device 10 is connected to the keyboard/mouse connector 30B provided on the surface of the housing of the server 30, with a cable 300A that is an industry standard cable used for connection to a keyboard and a mouse, such as a PS/2 cable, a USB cable, or a serial cable of some other kind.

The reception device 20 includes a VGA (Video Graphics Array) connector 20B as a display connector for outputting image signals (RGB), horizontal synchronization signals, and vertical synchronization signals to the display 40. This VGA connector 20B may be an industry standard connector such as a BNC connector or a D-sub 15-pin connector. A RGB cable 200B that is provided on the display 40 is connected to the VGA connector 20B. The RGB cable 200B is also a BNC cable, a D-sub 15-pin cable, or the like.

The reception device 20 further includes a keyboard/mouse connector 20C for receiving operation signals from the keyboard/mouse 50. The keyboard/mouse connector 20C may also be an industry standard connector used for connection to a keyboard and a mouse, such as a PS/2 connector, a USB (Universal Serial Bus) connector, or a serial connector or some other kind. A cable 300B that is provided on the keyboard/mouse 50 is connected to the keyboard/mouse connector 20C. The cable 300B is also an industry standard cable used for connection to a keyboard and a mouse, such as a PS/2 cable, a USB cable, or a serial cable or some other kind.

The inner structures of the transmission device 10 and the reception device 20 will now be described in detail. The following description concerns an example case where an image signal (G) among RGB image signals is superimposed on a horizontal synchronization signal (hereinafter referred to as the synchronization signal HSYNC), and an image signal B is superimposed on a vertical synchronization signal (hereinafter referred to as the synchronization signal VSYNC).

Figure 2:
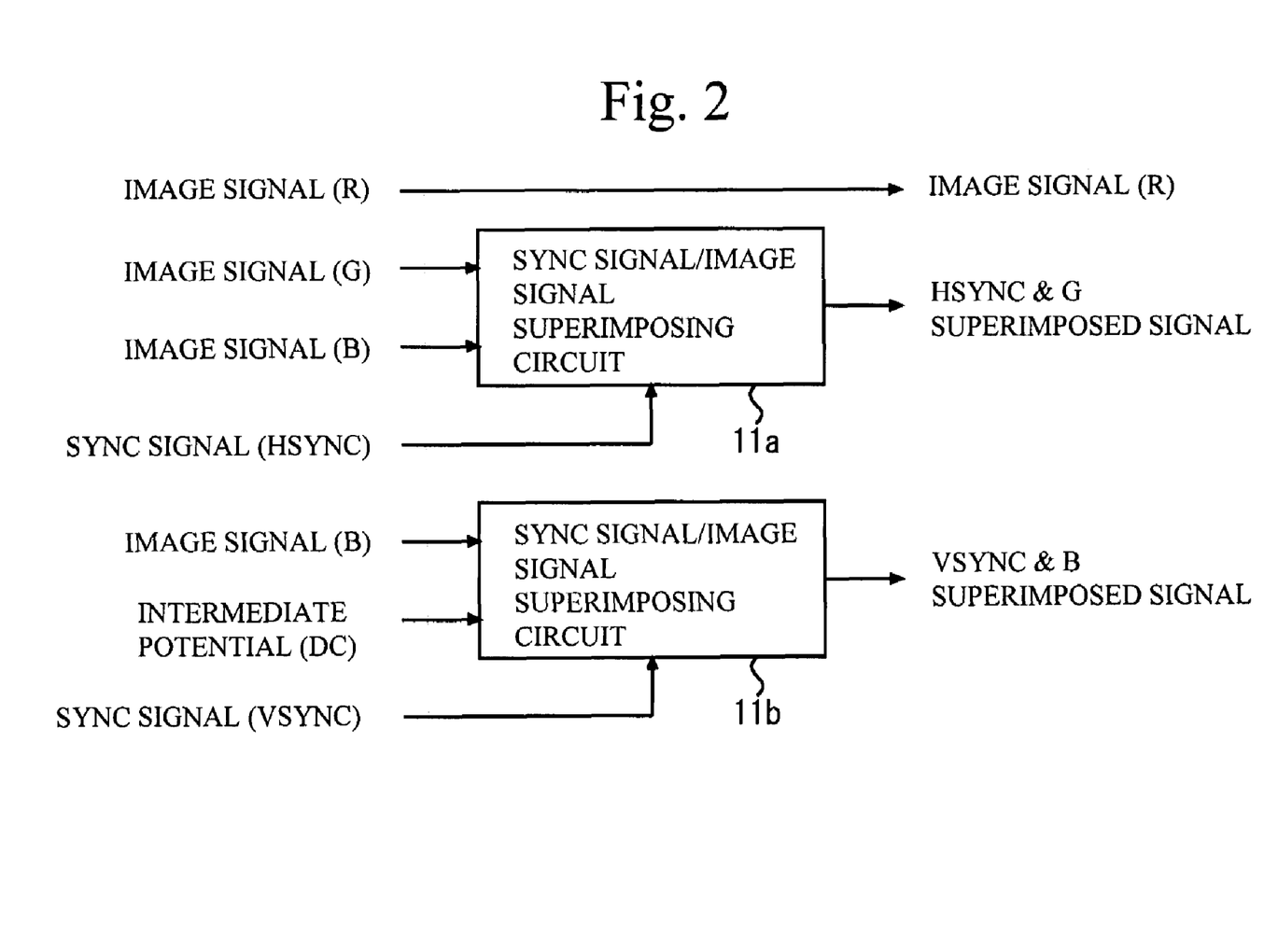
FIG. 2 is a block diagram illustrating the inner structure of the transmission device in accordance with the first embodiment of the present invention.

FIG. 2 is a block diagram illustrating the inner structure of the transmission device 10 in accordance with this embodiment. As shown in FIG. 2, the transmission device 10 includes a synchronization signal/image signal superimposing circuits 11a and 11b. The synchronization signal/image signal superimposing circuit 11a superimposed the image signal (G) of image signals RGB, inputted through the VGA connector 10B, with the synchronization signal HSYNC. The synchronization signal/image signal superimposing circuit 11b superimposes the image signal (B) on the synchronization signal VSYNC.

More specifically, the image signal (G) of the image signals (RGB) is inputted into the synchronization/image signal superimposing circuit 11a. The synchronization signal HSYNC is also inputted into the synchronization signal/image signal superimposing circuit 11a. Further, an intermediate potential (DC) is constantly applied to the synchronization signal/image signal superimposing circuit 11a. Likewise, the image signal (B) of the image signals (RGB) is inputted into the synchronization/image signal superimposing circuit 11b. The synchronization signal VSYNC is also inputted into the synchronization signal/image signal superimposing circuit 11b. Further, an intermediate potential (DC) is constantly applied to the synchronization signal/image signal superimposing circuit 11b. The normal voltage level of the image signals (RGB) is approximately 1 V at the highest, and the normal voltage level of the synchronization signals is approximately 5 V, which is as high as the internal voltage level. The intermediate potential (DC) is higher than the voltage level of the image signals, but is lower than the voltage level of the synchronization signals. In this embodiment, the intermediate potential (DC) is set at 2.5 V.

Figure 3A:
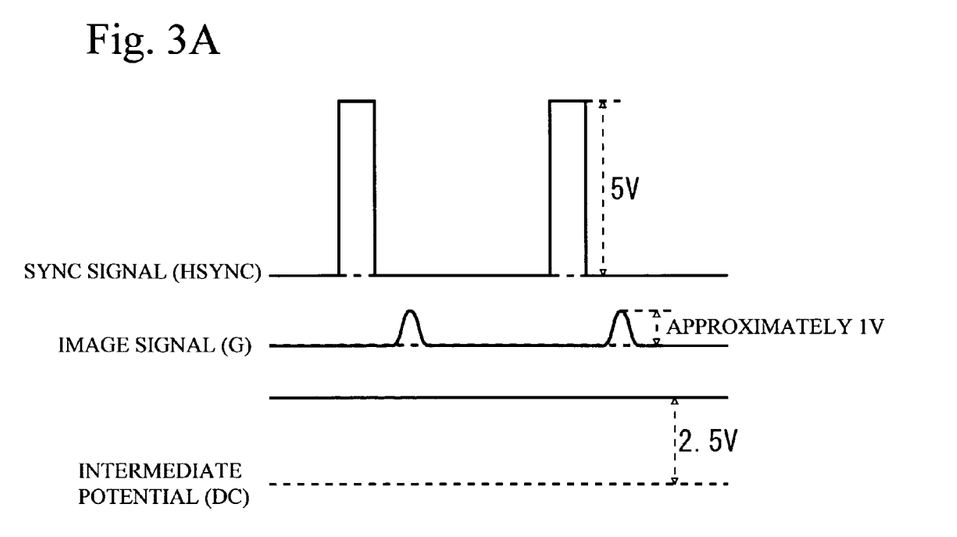
FIG. 3A shows the waveforms of a synchronization signal and an image signal prior to a superimposing operation.
Figure 3B:
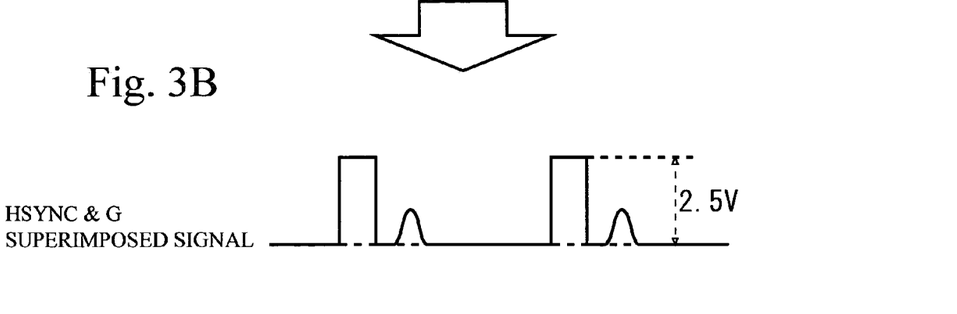
FIG. 3B shows the waveform of a superimposed signal of the synchronization signal and the image signal obtained through the superimposing operation.

Referring now to FIGS. 3A and 3B, the operations of the synchronization signal/image signal superimposing circuits 11a and 11b will be described in detail. Since the synchronization signal/image signal superimposing circuits 11a and 11b have the same structures and operate in the same manner as each other, only the structure and the operation of the synchronization signal/image signal superimposing circuit 11a will be described in the following. FIG. 3A illustrates the synchronization signal HSYNC, the image signal (G), and the intermediate potential (DC) before the superimposing operation. FIG. 3B illustrates a superimposed signal of the synchronization signal HSYNC and the image signal (G) after the superimposing operation.

The synchronization signal/image signal superimposing circuit 11a includes a multiplexer. The synchronization signal HSYNC is used as a switch signal for switching outputs of the multiplexer. As shown in FIG. 3A, the synchronization signal/image signal superimposing circuit 11a selects the intermediate potential (DC) as an output while the synchronization signal HSYNC is being inputted, but selects the image signal (G) as an output while the synchronization signal HSYNC is not being inputted. By doing so, the image signal (G) is superimposed on the synchronization signal HSYNC, and the superimposed signal having a voltage level of 2.5 V is obtained.

Although the image signals (G) and (B) are superimposed on the respective synchronization signals in this embodiment, any image signal of the image signals RGB may be superimposed on either of the synchronization signals.

The image signal (R), the superimposed signal of the synchronization signal HSYNC and the image signal (G), and the superimposed signal of the synchronization signal VSYNC and the image signal (B), obtained in the above described manner, are then inputted into the network interface 10A. The network interface 10A allots each of the inputted signals to one of predetermined signal line on the LAN cable 100, and thus transmits the inputted signals to the reception device 20.

Figure 4:
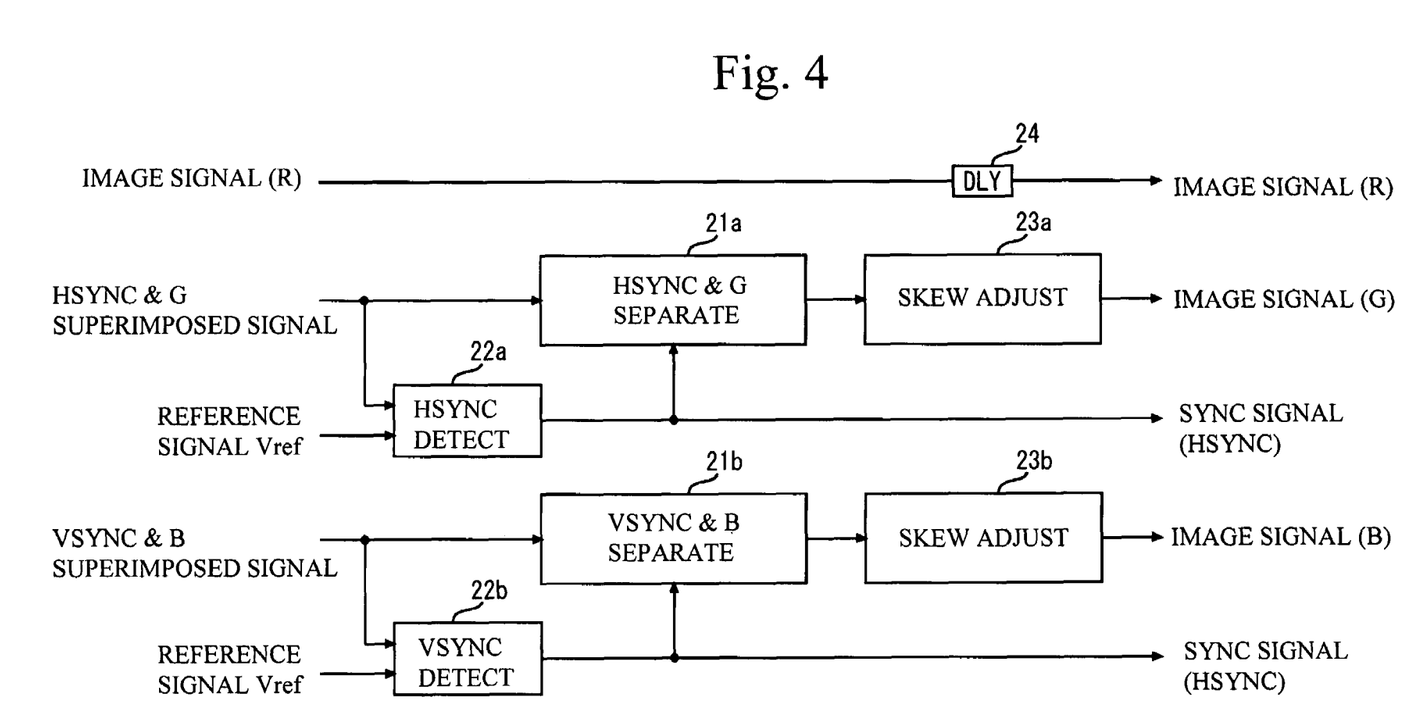
FIG. 4 is a block diagram illustrating the inner structure of the reception device in accordance with the first embodiment of the present invention.

FIG. 4 is a block diagram illustrating the inner structure of the reception device 20 in accordance with this embodiment. As shown in FIG. 4, the reception device 20 includes synchronization signal/image signal separating circuits 21a and 21b, synchronization signal detecting circuits 22a and 22b, and image signal skew adjusting circuits 23a and 23b. The synchronization signal/image signal separating circuits 21a and 21b separate each superimposed signal of a synchronization signal and an image signal from the other signals received through the network interface 20A. The synchronization signal detecting circuits 22a and 22b detect synchronization signals. The image signal skew adjusting circuits 23a and 23b adjust time delays (or skews) of the image signals (G) and (B). The image signal (R) is delayed by a prefixed delay element (DLY) 24 by a predetermined amount of time.

More specifically, the superimposed signal of the synchronization signal HSYNC and the image signal (G) is inputted into the synchronization signal/image signal separating circuit 21a and the synchronization signal detecting circuit 22a. A reference signal Vref is also inputted into the synchronization signal detecting circuit 22a. The voltage level of the reference signal Vref is lower than the voltage level of the intermediate potential (DC) on the reception side, but is higher than the voltage level of the image signals. In this embodiment, the voltage level of the reference signal Vref is set at 2.0 V. Likewise, the superimposed signal of the synchronization signal VSYNC and the image signal (B) is inputted into the synchronization signal/image signal separating circuit 21b and the synchronization signal detecting circuit 22b. A reference signal Vref that is the same as the above is also inputted into the synchronization signal detecting circuit 22b. Since the structures and operations of the synchronization signal/image signal separating circuit 21a and the synchronization signal detecting circuit 22a are the same as the structures and operations of the synchronization signal/image signal separating circuit 21b and the synchronization signal detecting circuit 22b, respectively, only the structures and operations of the synchronization signal/image signal separating circuit 21a and the synchronization signal detecting circuit 22a will be described below.

Figure 5A:
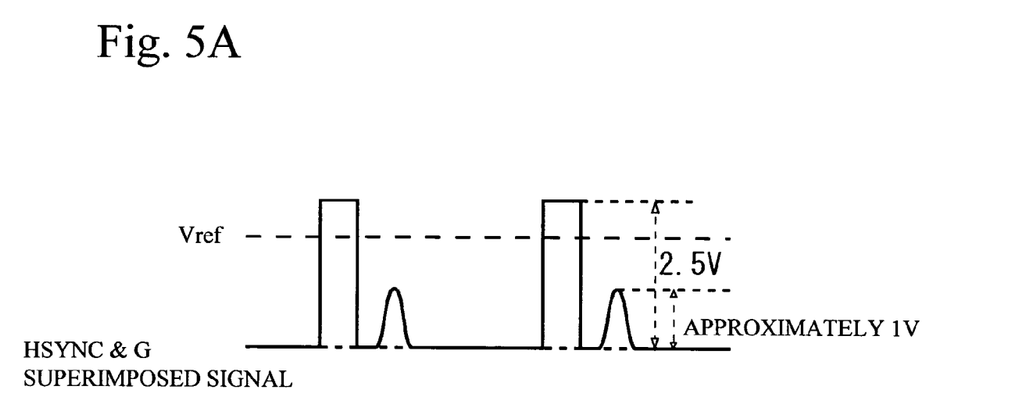
FIG. 5A shows the waveform of a superimposed signal of a synchronization signal and an image signal prior to a separating operation.
Figure 5B:
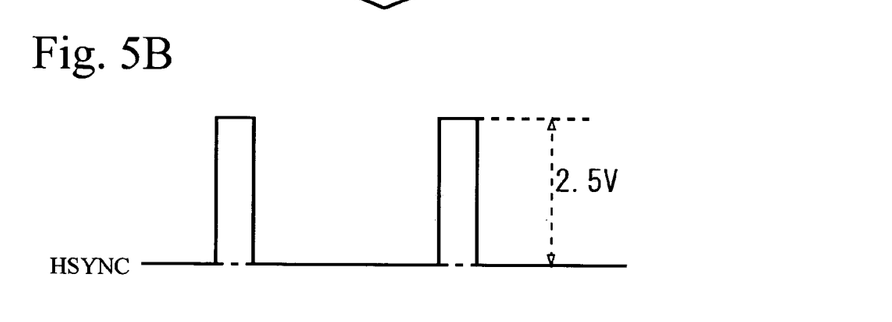
FIG. 5B shows the waveform of the synchronization signal obtained through the separating operation.

The synchronization signal detecting circuit 22a includes a comparator, and utilizes the inputted reference signal Vref as the trigger level. While the voltage level of the inputted superimposed signal of the synchronization signal HSYNC and the image signal (G) is higher than the voltage level of the reference signal Vref, as shown in FIG. 5A, the synchronization signal detecting circuit 22a outputs it as the synchronization signal HSYNC, as shown in FIG. 5B. The outputted synchronization signal HSYNC is then inputted into the display 40 via the VGA connector 20B and into the synchronization signal/image signal separating circuit 21a.

Figure 6A:
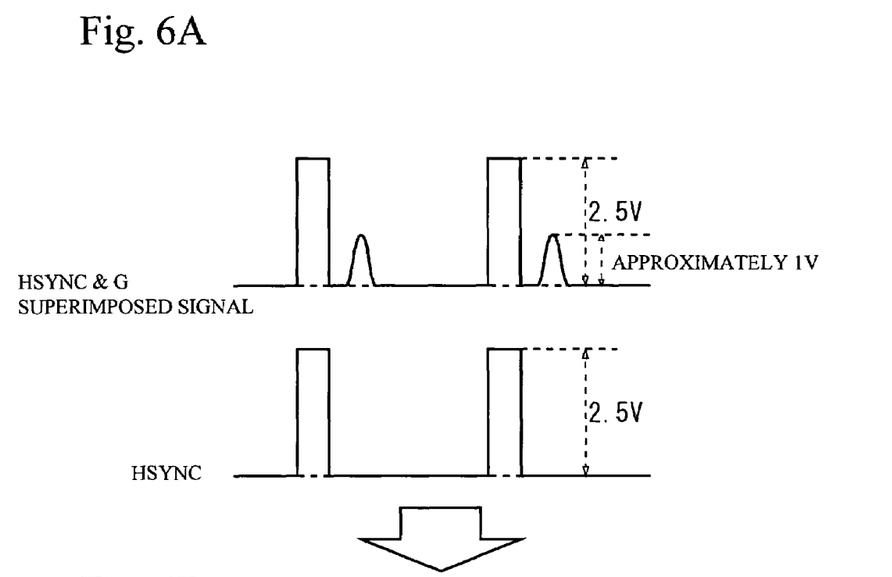
FIG. 6A shows the waveforms of a superimposed signal of a synchronization signal and an image signal, and the synchronization signal prior to a separating operation.
Figure 6B:
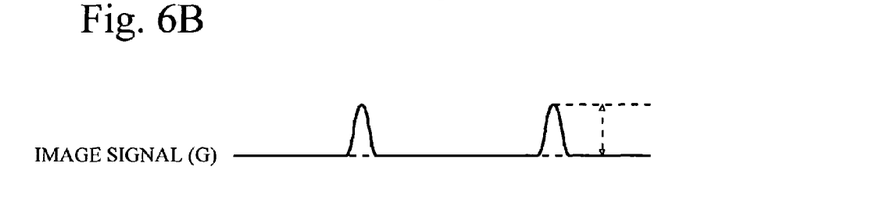
FIG. 6B shows the waveform of the image signal obtained through the separating operation.

The synchronization signal/image signal separating circuit 21a includes a multiplexer. The synchronization signal HSYNC detected by the synchronization signal detecting circuit 22a is used as a switch signal for switching outputs of the multiplexer. As shown in FIG. 6A, the synchronization signal/image signal separating circuit 21a selects the ground potential as an output while the synchronization signal HSYNC is being inputted, but selects the superimposed signal of the synchronization signal HSYNC and the image signal (G) as an output while the synchronization signal HSYNC is not being inputted. By doing so, the synchronization signal/image signal separating circuit 21a can output only the image signal (G), as shown in FIG. 6B.

The image signals (G) and (B), which have been separated from the synchronization signals HSYNC and VSYNC in the above manner, are then inputted into the image signal skew adjusting circuits 23a and 23b, respectively. Since the structures and operations of the image signal skew adjusting circuits 23a and 23b are the same as each other, only the structure and operation of the image signal skew adjusting circuit 23 will be described below.

Figure 7:
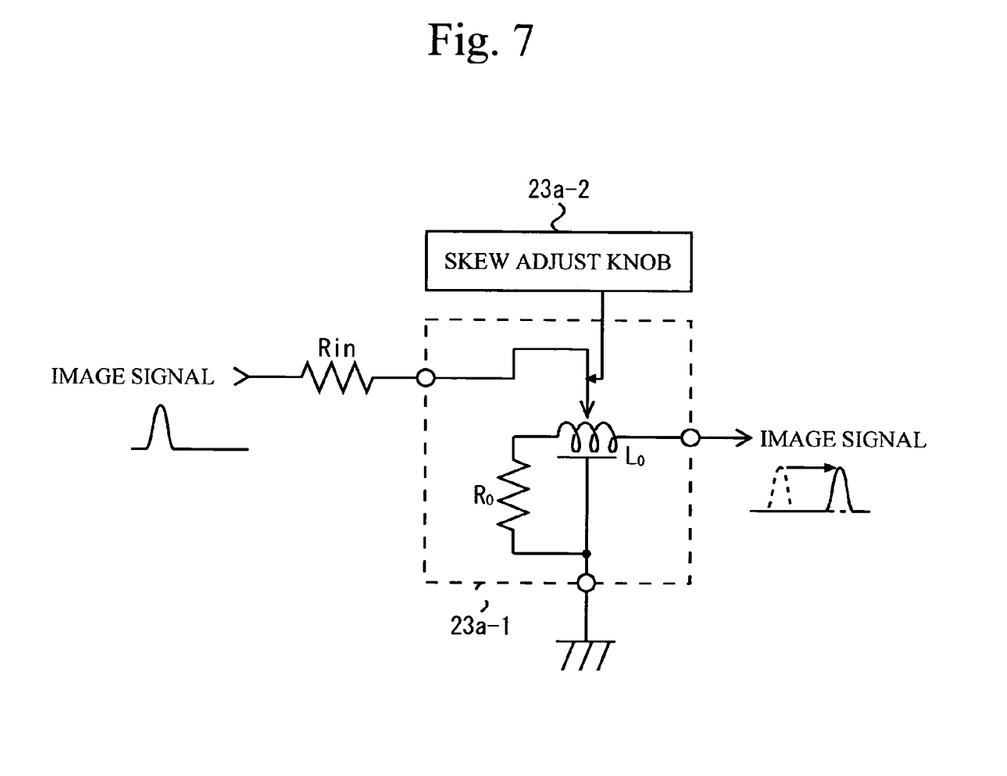
FIG. 7 illustrates the structure of an image signal skew adjusting circuit in accordance with the first embodiment of the present invention.

The image signal skew adjusting circuit 23a includes a delay element 23a-1 shown in FIG. 7. The delay element 23a-1 includes a variable impedance $L_0$ and a resistance $R_0$ that is connected to the variable impedance $L_0$ in series. The other end of the resistance $R_0$ is grounded. The impedance adjusting mechanism of the variable impedance $L_0$ is linked to a skew adjusting knob 23a-2 that is located outside the delay element 23a-1. Accordingly, a user should handle the skew adjusting knob 23a-2 to adjust a delay caused by the delay element 23a-1. Further, an input matching resistance $R_{in}$ is provided at the input stage of the delay element 23a-1 to perform impedance matching.

Figure 8A:
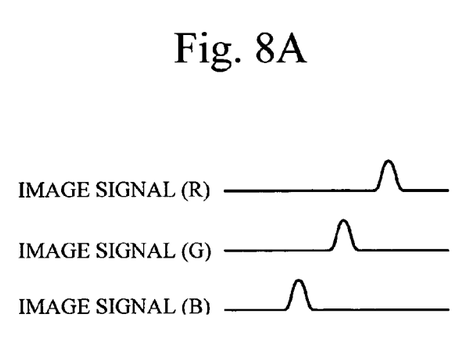
FIG. 8A shows the waveforms of RGB image signals prior to a delay (skew) adjusting operation.
Figure 8B:
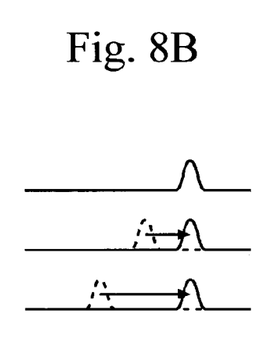
FIG. 8B shows the waveforms of the RGB image signals after the delay (skew) adjusting operation.

Delays of the image signals (RGB) are adjusted by the above described image signal skew adjusting circuits 23a and 23b, so that synchronization can be maintained among the image signals (RGB), as shown in FIG. 8B, even when there are delay differences (transmission time differences) as shown in FIG. 8A.

Figure 9A:
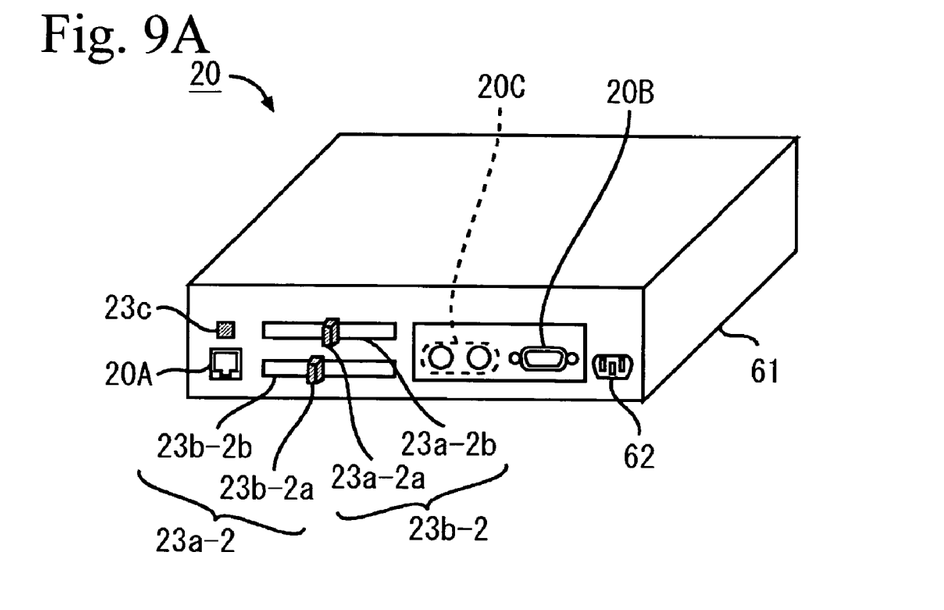
FIG. 9A is an external view of the rear surface of the housing of the reception device including the skew adjusting knobs in accordance with the first embodiment of the present invention.
Figure 9B:
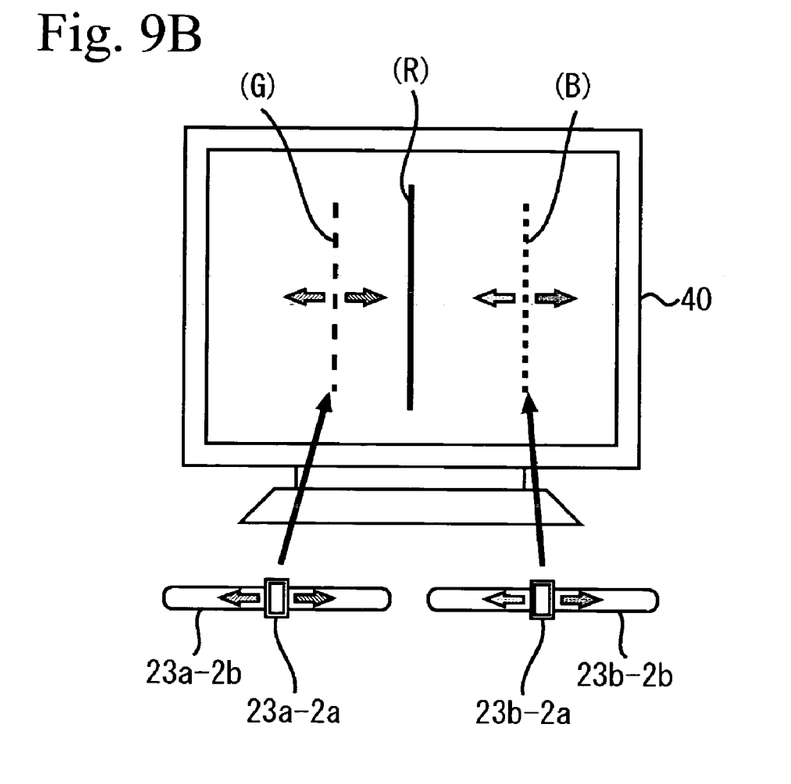
FIG. 9B illustrates the adjustment screen to be displayed on the display at a time of skew adjusting in accordance with the first embodiment of the present invention.

Referring now to FIGS. 9A and 9B, the skew adjusting knobs 23a-2 and 23b-2 provided in the reception device 20 and the adjustment screen at a time of skew adjusting will be described in detail. FIG. 9A is an external view of the rear surface of the housing of the reception device 20 including the skew adjusting knobs 23a-2 and 23b-2. FIG. 9B illustrates the adjustment screen that is displayed on the display 40 at a time of adjusting skews.

As shown in FIG. 9A, the rear surface of the housing 61 has the network interface 20A into which the LAN cable 100 is to be inserted (especially a jack), the VGA connector 20B into which the RGB cable 200B is to be inserted, and the keyboard/mouse connector 20C into which the cable 300B is to be inserted. The skew adjusting knobs 23a-2 and 23b-2 to be used for adjusting delays of the delay elements 23a-1 and 23b-1 of the image signal skew adjusting circuits 23a and 23b are also provided on the rear surface of the housing 61. Further, a power supply part 62 into which a power supply cable is to be inserted is provided on the rear surface of the housing 61.

The skew adjusting knob 23a-2 includes a knob 23a-2a that is to be slid by a user to adjust a delay, and a slit 23a-2b that extends in the sliding direction of the knob 23a-2a. Likewise, the skew adjusting knob 23b-2 includes a knob 23b-2a to be slid by a user to adjust a delay, and a slit 23b-2b that extends in the sliding direction of the knob 23b-2a. Although the skew adjusting knobs 23a-2 and 23b-2 are formed on the surface of the housing 61 in FIG. 9A, it is possible to form the skew adjusting knobs 23a-2 and 23b-2 inside the housing 61.

Referring now to FIG. 9B, the process of maintaining synchronization among the image signals (RGB) using the skew adjusting knobs 23a-2 and 23b-2 will be described. In FIG. 9B, the center line (R) displayed at the center of the display 40 is a reference line determined based on the image signal (R) that is not to be adjusted and is to be used as the reference signal. The center line (R) is designed to be fixed at the center of the screen during an adjusting operation. On this screen, the axis extending in the horizontal direction represents the time axis. The green line (G) displayed on the screen represents the relative shift of synchronization of the image signal (G), with the image signal (R) being the reference, which is 5 ns, for example. As the right half of the screen represents the positive value area, the image signal (G) is behind time with respect to the image signal (R). So as to manually adjust the delay of the image signal (G), a user slides the knob 23a-2a toward the right in FIG. 9B. By doing so, the value of the variable impedance $L_0$ becomes smaller, and the amount of delay decreases accordingly. Looking at the screen, the user continues to slide the knob 23a-2a until the green line (G) and the center line (R) overlap each other. When the green line (G) and the center line (R) overlap each other, synchronization is established between the image signal (R) and the image signal (G). The blue line (B) represents the relative shift of synchronization of the image signal (B), with the image signal (R) being the reference signal. Like the green line (G) described above, the image signal (B) can be synchronized with the image signal (R) by sliding the knob 23b-2a.

The screen shown in FIG. 9B may be displayed as a test mode upon request from the reception device 20 to the transmission device 10. The request for the test mode may be made by a user pressing a test mode button 23c provided on the rear surface of the reception device 20 shown in FIG. 9A. More specifically, when a user presses the test mode button 23c, a test mode requesting instruction is generated in the reception device 20, and is transmitted to the transmission device 10 through the LAN cable 100. The signal line of the LAN cable 100 used for the transmission of the requesting instruction should preferably be the same as the signal line used for transmission of the operation signals from the keyboard/mouse 50. If the test mode requesting instruction exists in a received datagram, the transmission device 10 starts a predetermined process to transmit image signals for displaying the screen shown in FIG. 9B to the reception device 20. Here, the image signals do not have delays on the transmission side (in the transmission device 10).

The method of adjusting differences of delay amounts among the image signals is not limited to the method utilizing the screen shown in FIG. 9B, but may be a method that utilizes a regular display screen.

With the above structure, a user can visually establish synchronization among the image signals while looking at the screen. Accordingly, adjustment can be carried out with ease, and, even if each image signal is superimposed on another signal, a shift of synchronization of each image signal caused by a difference in cable length or a difference in transmission characteristics can be corrected.

Second Embodiment

Figure 10:
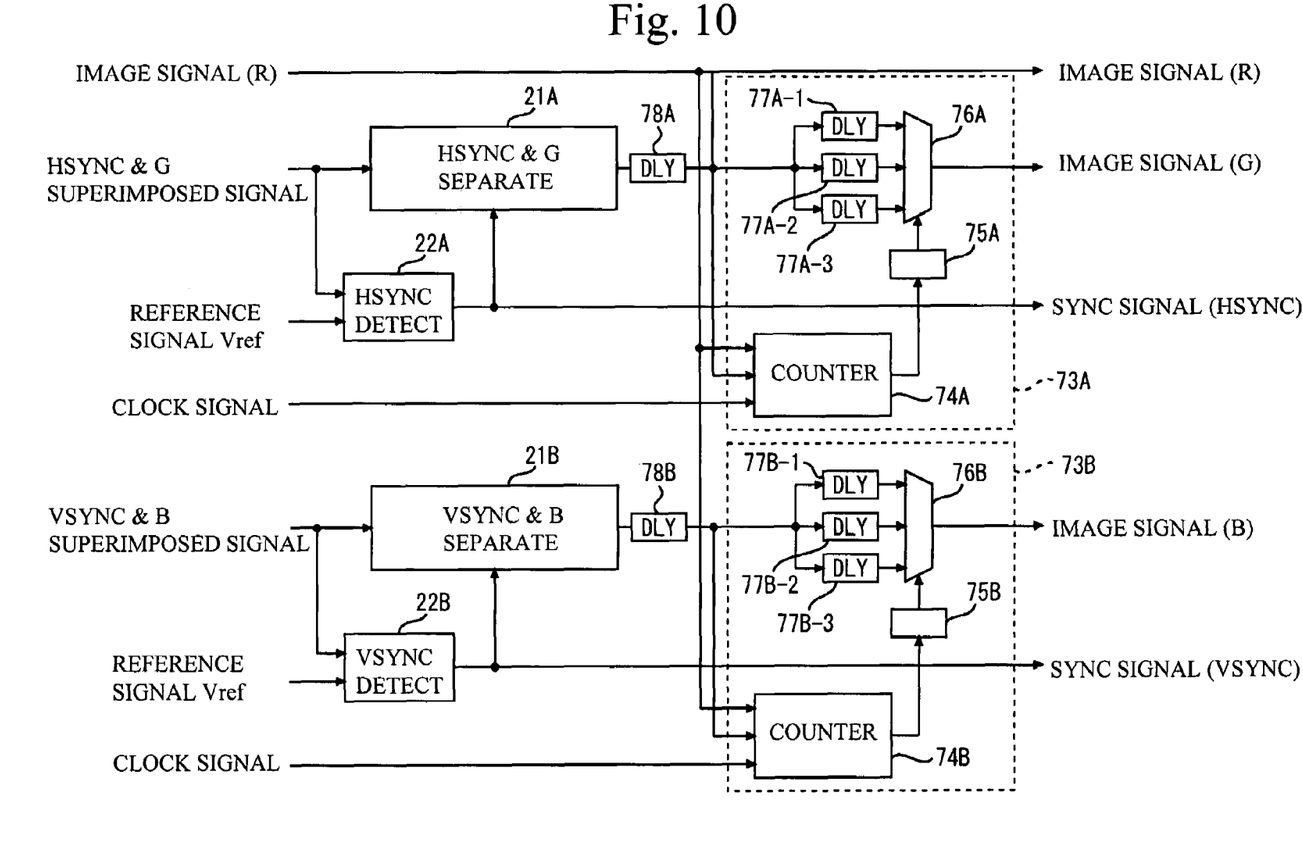
FIG. 10 is a block diagram illustrating the inner structure of a reception device in accordance with a second embodiment of the present invention.

Next, a second embodiment of the present invention will be described in detail. FIG. 10 is a block diagram illustrating the inner structure of a reception device 70 in accordance with this embodiment. In FIG. 10, the same components as those of the first embodiment are denoted by the same reference numerals as the corresponding reference numerals of the first embodiment, and therefore, explanation of them is omitted herein.

The reception device 70 of this embodiment differs from the reception device 20 of the first embodiment in that delays of image signals are automatically adjusted. So as to achieve this feature, the reception device 70 of this embodiment includes image signal skew adjusting circuits 73A and 73B, instead of the image signal skew adjusting circuits 23a and 23b of the first embodiment. Since the structures and operations of the image signal skew adjusting circuits 73A and 73B are the same, only the structure and operation of the image signal skew adjusting circuit 73A will be described below.

The image signal skew adjusting circuit 73A of this embodiment includes a counter 74A, a decoder 75A, a multiplexer 76A, and delay elements (DLYs) 77A-1, 77A-2, and 77A-3.

An image signal (R), an image signal (G) outputted from a synchronization signal (HSYNC)/image signal (G) separating circuit 21A, and a clock signal of predetermined cycles, are inputted into the counter 74A. When receiving the image signal (R), the counter 74A starts increasing the counter value. When the image signal (G) is inputted, the counter 74A ends increasing counter value. After inputted into the decoder 75A, the counter value is reset to zero. A delay element 78A that delays a signal by a larger amount than a predicted delay amount is provided at the output stage of the synchronization signal (HSYNC)/image signal (G) separating circuit 21A or at the image signal (G) input stage of the counter 74A, so that the image signal (G) is inputted into the counter 74A always after the image signal (R). Accordingly, the image signal (R) is inputted into the counter 74A always before the image signal (G).

The image signal (G) outputted from the synchronization signal (HSYNC)/image signal (G) separating circuit 21A passes through the delay element 78A, and then branches out into the delay elements 77A-1, 77A-2, and 77A-3. Although the three delay elements 77A-1, 77A-2, and 77A-3 are shown in FIG. 10, the number of delay elements 77A is not limited to three. The delay elements 77A-1, 77A-2, and 77A-3 have different delay amounts. In this embodiment, the delay element 77A-1 has a delay of 20 ns, the delay element 77A-2 has a delay of 40 ns, and the delay element 77A-3 has a delay of 60 ns, for example. The outputs of the delay elements 77A-1, 77A-2, and 77A-3, are inputted into the multiplexer 76A.

The decoder 75A decodes the counter value inputted from the counter 74A, and inputs an output select signal to the multiplexer 76A. Based on the select signal decoded in accordance with the counter value, the multiplexer 76A selectively outputs the image signal (G) delayed by one of the delay elements 77A-1, 77A-2, and 77A-3. By doing so, the image signal that has been delayed in the most desirable manner is automatically selected and outputted. Except that the skew adjusting knobs 23a-2 and 23b-2 are not employed, the other aspects of this embodiment are the same as those of the first embodiment, and therefore, explanation of them is omitted herein.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A remote unit, comprising:
   a receiving part that receives R, G, and B image signals having different transmission times via a first network, vertical and horizontal synchronizing signals being superimposed on two of the R, G, and B image signals;
   a separating part that separates the two of the R, G, and B image signals from the vertical and horizontal synchronizing signals by using vertical and horizontal synchronizing signals detected by using a reference signal having a potential between the R, G, and B image signals and the vertical and horizontal synchronizing signals; and
   an adjusting part that synchronizes the R, G, and B image signals with each other by removing relative delays of the two of the R, G, and B image signals with respect to a remaining one of the R, G, and B image signals.

2. The remote unit as claimed in claim 1, further comprising a knob for manually adjusting a delay of one of the image signals, in the adjusting part.

3. The remote unit as claimed in claim 1, further comprising a RJ connector that connects with the first network.

4. The remote unit as claimed in claim 1, wherein:
   the receiving part receives the different R, G, and B signals via three respective terminals of a connector that connects with the first network.

5. The remote unit as claimed in claim 1, wherein the separating part includes a multiplexer.

6. The remote unit as claimed in claim 1, wherein the adjusting part includes a variable impedance element.

7. The remote unit as claimed in claim 1, further comprising a detecting part that detects the horizontal synchronization signal or the vertical synchronization signal, wherein:
   the separating part includes a multiplexer;
   the multiplexer outputs a ground potential while the horizontal synchronization signal or the vertical synchronization signal detected by the detecting part is being inputted, and outputs one of the two image signals on which vertical and horizontal synchronizing signals are superimposed while the horizontal synchronization signal or the vertical synchronization signal is not being inputted, thereby separating the one of the two image signals from the horizontal synchronization signal or the vertical synchronization signal.

8. The remote unit as claimed in claim 7, wherein the detecting part includes a comparator.

9. A remote system, comprising:
   a transmission device that transmits R, G, and B image signals via a first network; and
   a reception device that receives the R, G, and B image signals via the first network; wherein
   the R, G, and B image signals have respective different transmission times between the transmission device and the reception device,
   the transmission device includes a superimposing part that convolutes vertical and horizontal synchronizing signals on two of the R, G, and B image signals, and a transmitting part that transmits the R, G, and B image signals to the first network, and
   the reception device includes a receiving part that receives the R, G, and B image signals transmitted via the first network, a separating part that separates two of the R, G, and B image signals from the vertical and horizontal synchronizing signals by using vertical and horizontal synchronizing signals detected by using a reference signal having a potential between the R, G, and B image signals and the vertical and horizontal synchronizing signals, and an adjusting part that synchronizes the R, G, and B image signals with each other by removing relative delays of the two of the R, G, and B image signals with respect to a remaining one of the R, G, and B image signals.

10. A method of processing image signals received from a network, comprising:

receiving R, G, and B image signals arriving from the network via different paths by a receiver, vertical and horizontal synchronizing signals being superimposed on two of the R, G, and B image signals;

separating the vertical and horizontal synchronizing signals from the two of the R, G, and B image signals, using a reference signal having a potential between the two R, G, and B image signals and the vertical and horizontal synchronizing signals superimposed on the two of the R, G, and B image signals, respectively;

synchronizing the two R, G, and B image signals by removing relative delays of the two of the R, G, and B image signals on which the vertical and horizontal synchronizing signals have been superimposed, relative to a third one of the R, G, and B image signals.

* * * * *